United States Patent [19]
Verhulst et al.

[11] Patent Number: 5,684,504
[45] Date of Patent: Nov. 4, 1997

[54] DISPLAY DEVICE

[75] Inventors: Antonius G. H. Verhulst; Robert A. Hartman, both of Eindhoven, Netherlands

[73] Assignee: U.S. Philips Corporation, New York, N.Y.

[21] Appl. No.: 492,828

[22] Filed: Jun. 20, 1995

[30] Foreign Application Priority Data

Jun. 23, 1994 [EP] European Pat. Off. .............. 94201807

[51] Int. Cl.$^6$ ..................................................... G09G 3/36
[52] U.S. Cl. .................. 345/97; 345/95; 348/766
[58] Field of Search .......................... 345/87, 88, 90, 345/91, 92, 94, 95, 97, 210, 208; 348/742, 744, 761, 766, 756; 359/56

[56] References Cited

U.S. PATENT DOCUMENTS

| Re. 33,120 | 11/1989 | Nagae et al. | 345/97 |
|---|---|---|---|
| 4,638,310 | 1/1987 | Ayliffe | 345/97 |
| 4,904,061 | 2/1990 | Aruga | 350/339 |
| 4,907,862 | 3/1990 | Suntola | 350/345 |
| 4,976,515 | 12/1990 | Hartman | 345/97 |
| 5,410,370 | 4/1995 | Janssen | 348/766 |
| 5,416,514 | 5/1995 | Janssen et al. | 348/761 |
| 5,508,738 | 4/1996 | Janssen et al. | 348/761 |
| 5,528,318 | 6/1996 | Janssen | 348/756 |

FOREIGN PATENT DOCUMENTS

| 492721A2 | 12/1991 | European Pat. Off. | H04N 9/31 |
|---|---|---|---|
| 0489459A2 | 6/1992 | European Pat. Off. | G09G 3/36 |

*Primary Examiner*—Richard Hjerpe
*Assistant Examiner*—Kara Farnandez Stoll
*Attorney, Agent, or Firm*—Robert J. Kraus

[57] ABSTRACT

Color display device for projection of the type comprising a light-switching device, for example a device illuminated by successive light strips of different colors (sequential color single panel projector) in which a display device with a matrix of pixels driven by active switching elements is advantageously used for the light-switching device (based on, for example ferro-electric liquid crystal material), the drive being chosen to be such that there is no memory action to a subsequent sub-frame. Due to the voltage-independent capacitance, notably of ferro-electric pixels, a simple drive mode can be used in which a simple correction for possible capacitive effects is sufficient. Notably in a two-pole drive mode, use can be made of the relatively longer time available for (optical) reset. A combination of the two types of drive mode is possible. Compensation of DC effects within a small part of the frame period is also possible without affecting the contrast.

8 Claims, 9 Drawing Sheets

DISPLAY DEVICE

BACKGROUND OF THE INVENTION

1. Field of the Invention

The invention relates to a colour display device comprising an illumination system for generating light beams of different colours within a frame period, and a control device for addressing the light-switching device for providing picture information of the colour of the relevant light beam so as to modulate said light beam with the picture information. Such devices are notably used in projection systems for video applications.

The invention particularly relates to a colour display device comprising an illumination system for generating simultaneous light strips of different colours, and a light-switching device, an optical system for displacing the light strips of different colours across a surface of the light-switching device so that parts of all different colours simultaneously reach the light-switching device, and a control device for addressing each individual of the light-switching device illuminated by a light strip of a colour so that the relevant part provides picture information having the colour of the relevant light strip and modulates this light strip with the picture information.

The invention also relates to a display device for use in such colour display devices.

2. Description of the Related Art

A colour display device of the type described in the opening paragraph is known from EP-A-0 492 721 (PHA 21.648). In the device shown in this document a colour picture is obtained by regenerating red, green and blue sub-pictures in rapid succession by driving a part of a twisted-nematic liquid crystal during the passage of a light strip of a given colour across a part with the information associated with said colour. Since in this case the information changes at a much higher frequency than in the conventional display devices (the frame frequency is a factor of 3 higher), the use of twisted-nematic liquid crystal materials may present problems. In twisted-nematic materials the capacitance of a pixel is voltage-dependent so that correction is not uniform and hence difficult. Moreover, these materials usually react slowly. Since each pixel must consecutively display the information associated with different colours within one frame period, the voltage across a pixel cannot relax to a final value within a given period of time (for example one or two frame periods). The colour associated with other information may deviate from the colour associated with the previous information to such an extent that the previous value influences the ultimate value of the (colour) signal to be written (memory effect from (sub-)frame to (sub-)frame).

SUMMARY OF THE INVENTION

It is, inter alia an object of the invention to provide a colour display device of the type described in the opening paragraph, in which said influence substantially does not occur. It is another object of the invention to provide such a device in which the light-switching device reacts rapidly and in which the influence of the pixel capacitance need not be taken into account, or hardly needs to be taken into account, when the control signals are being presented.

To this end, a colour display device according to the invention is characterized in that the light-switching device comprises a matrix of pixels which can be driven via active switching elements, and a driving device which, prior to or during provision of a light beam of a given colour, causes the pixels to switch to the transmission value of the associated colour.

The active switching elements render the pixels substantially insensitive to voltages on the drive electrodes (row and column electrodes) which can already be provided with voltages for enabling switching of a subsequent (sub-)frame associated with a different colour, while the pixels are still being illuminated by a beam of a first (sub-)frame and thus comprise the associated information. Very good results are obtained if the light-switching device comprises a ferro-electric liquid crystal display device.

Display devices with ferro-electric material as liquid crystal material react rapidly, while the pixel capacitance is substantially independent of the voltage. The faster switching time renders this type of devices suitable for said higher frame frequencies, while the correction for a changing pixel capacitance can now be dispensed with.

Notably a display device which comprises means for bringing, prior to selection, a row of display elements to an extreme optical transmission state by means of an auxiliary signal as described in U.S. Pat. No. 4,976,515 is very suitable for this application. Since prior to selection all display elements in a row are reset completely optically ("blanking"), the memory effect is negligible. Such a display device, in which the change of signals on, for example column lines via capacitive effects has a minimum influence on the transmission value of pixels already written, is characterized in that the display device comprises a control circuit for presenting data voltages to the column electrodes during a time interval which ends after the time interval for presenting a voltage for selection to a row electrode. The data voltages are preferably presented during a time interval which starts before the time interval for presenting a voltage to a row electrode for the purpose of selection.

Three-pole switching elements (TFTs) may be used as active switching elements, but here only a part of the line period is available for the "blanking" pulse because other lines can be selected during the same line period when data signals must be presented.

The display devices may therefore also be implemented advantageously with two-pole switching elements, particularly with MIMs and a circuit in which one of the picture electrodes is connected in an electrically conducting manner to the common point of two diodes which are arranged between a column electrode and an electrode for a reference circuit; the picture electrode may then constitute the common point in this case.

Since the entire line period is now available for the "blanking" pulse, it may either have a lower amplitude so that simpler drive electronics are sufficient, or it may have more energy at the same amplitude so that switching is effected more rapidly, rendering the use of two-pole switching elements in said colour display devices with sub-frames and with moving light strips very well possible.

In a further, very suitable display device, in which degradation of the ferro-electric liquid crystal material due to possible DC components and hysteresis effects is prevented, the display device comprises a control circuit for presenting the auxiliary signal within a row selection period prior to selection and for presenting compensation voltages across the row of display elements within a further row selection period. Since, for the purpose of presenting the compensation voltage, the row of pixels must be selected while compensation voltages are simultaneously presented to the column electrodes, a row selection period or line period must now be divided into periods for compensation and for writing. When using TFTs, a further division for compensation, reset and writing is required. The compensation signal is now presented during a very short period of time (during a part of a row selection period which may be, for example a line period).

After selection, the row of display elements in applications with TFTs and MIMs or diode rings as switches is provided with a short-circuit signal, if necessary (a voltage of approximately 0 volt across the pixel), so that no DC component can build up during the remaining part of a frame period. Degradation due to DC components is now prevented because, viewed over one cycle or frame period, the integral of the voltage across a display element is substantially zero.

BRIEF DESCRIPTION OF THE DRAWINGS

These and other aspects of the invention will be apparent from and elucidated with reference to the embodiments described hereinafter.

In the drawings:

FIG. 6 shows diagrammatically the voltage variation for a number of row electrodes and a column electrode for the devices of FIGS. 3 and 4, and the voltage variation across the pixel, while FIG. 8 shows a modification of FIG. 7, while

Figure 2:
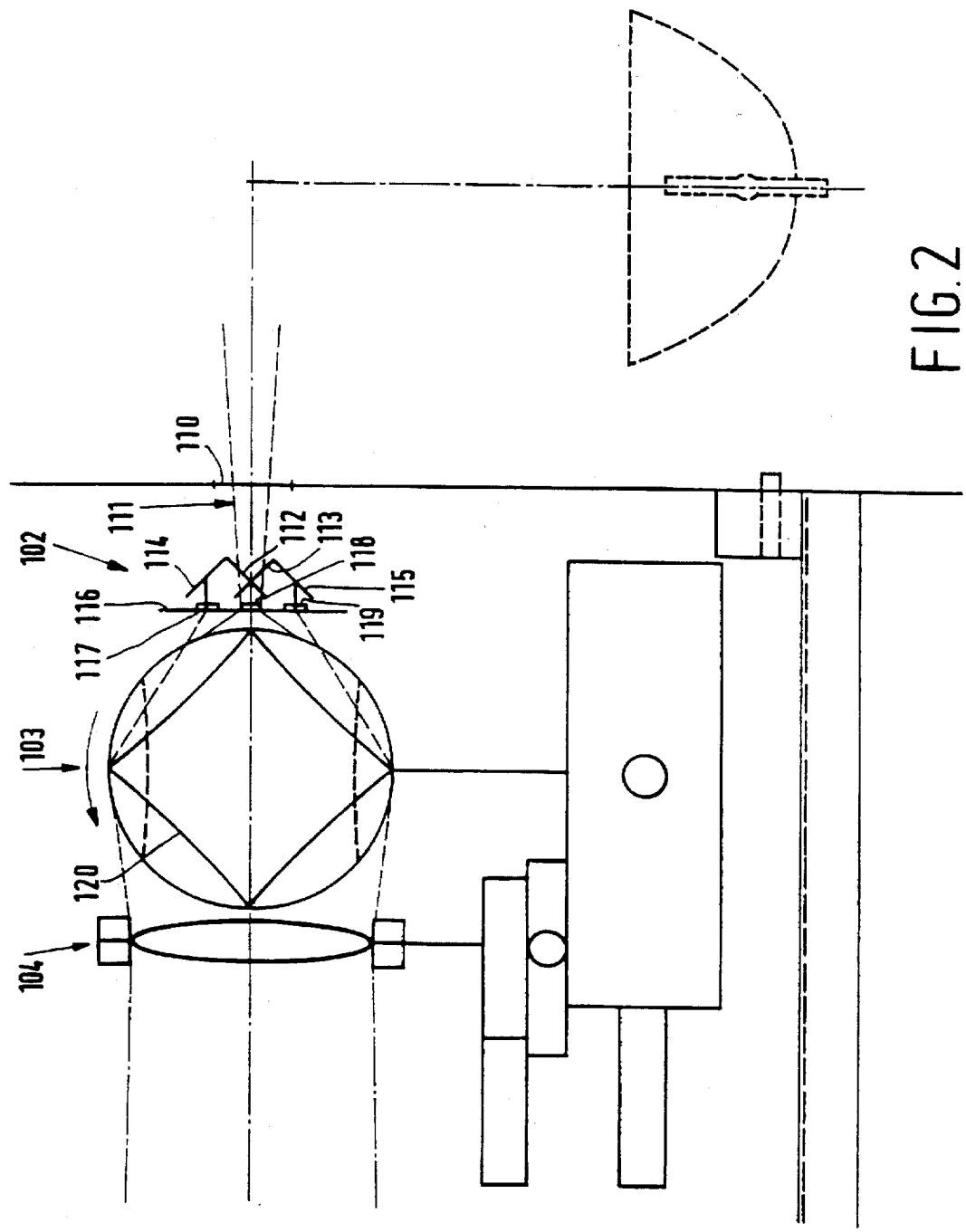
FIG. 2 shows diagrammatically the colour separating mechanism of the device of FIG. 1, FIGS. 3 and 4 show electrical equivalent diagrams of parts of ferro-electric liquid crystal display devices for use in the colour display device of FIG. 1.

As is shown in greater detail in FIG. 2, the light beam 111 leaving the aperture 110 is incident on the system 102 of dichroic mirrors, which system splits the beam 111 into different beams of different colours, in this example red, green and blue. To this end, the system 102 comprises centrally arranged, crossed dichroic mirrors 112, 113 which transmit only the green light component of the beam 111 and reflect the red and blue components upwards and downwards, respectively, towards mirrors 114 and 115. The upper mirror 114 (which may also be a dichroic mirror) reflects only the red component, whereas the lower mirror 115 reflects only the blue component. The mirrors 112, 113, 114 and 115 of the system 102 thus split the beam 111 into vertically superjacent red, green and blue sub-beams. A vertical aperture plate 116 has three superjacent rectangular apertures 117, 118 and 119 which also serve to give the sub-beams a rectangular shape. These sub-beams leave the apertures with the red beam at the top, the green beam in the middle and the blue beam at the bottom.

The split beam is subsequently incident on an optical scanning mechanism in the form of the rotating prism 103 having four equal sides (i.e. a square cross-section) which is rotated about its central longitudinal axis by a motor (not shown) which is synchronously driven with the (video) signals presented to the device 106. The result is that the red, green and blue colour strips follow each other upwardly or downwardly and are directed via lenses 104, 105 to the light valve 106. This light valve modulates the light in conformity with the input signals, whereafter the modulated, successive light strips of different colours are imaged by the projection lens 107 on a suitable surface such as a projection screen. For a more detailed description of the operation and structure of such a colour display device, reference is made to EP-A-0 492 721 (PHA 21.648).

In this example, the light valve 106 comprises a ferro-electric liquid crystal device 122. Such a device is shown diagrammatically in FIG. 3.

Figure 3:
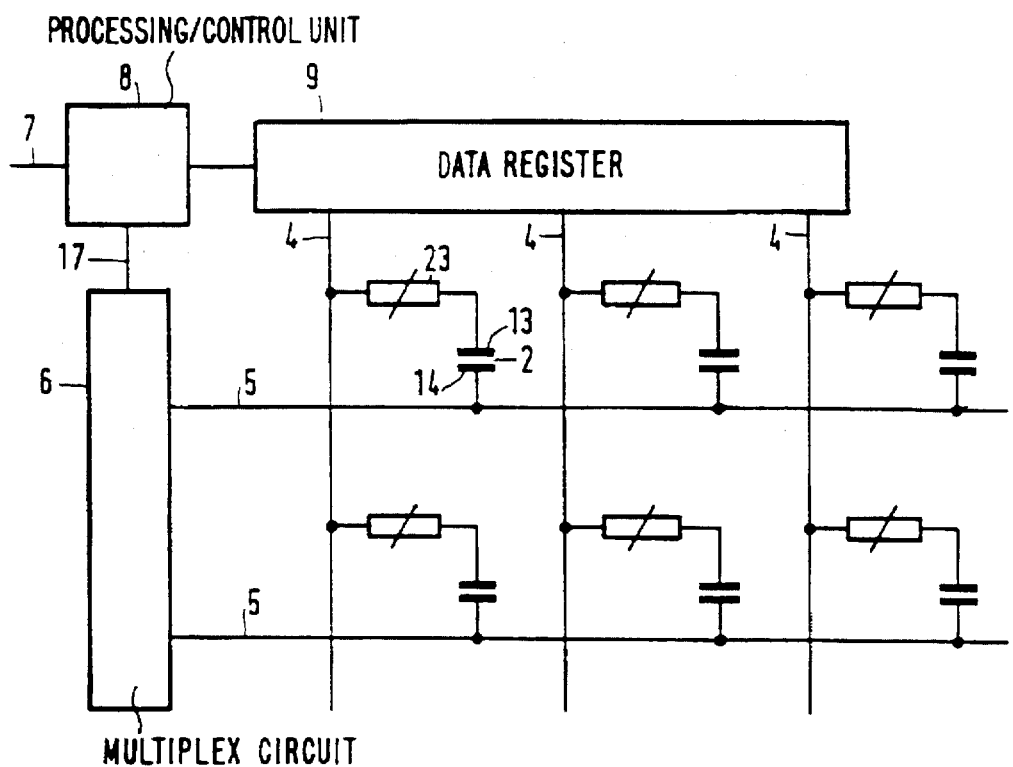

FIG. 3 shows an electrical equivalent diagram of a part of a display device 1. This device comprises a matrix of pixels 2 arranged in rows and columns. In this example, the pixels 2 are connected to column or data electrodes 4 via two-pole switches, in this example MIMs 23. A row of pixels is The use of the active switching elements prevents signals for other pixels from influencing the adjustment of the voltage across the pixels before these pixels are again selected (in a subsequent sub-frame).

Figure 5:
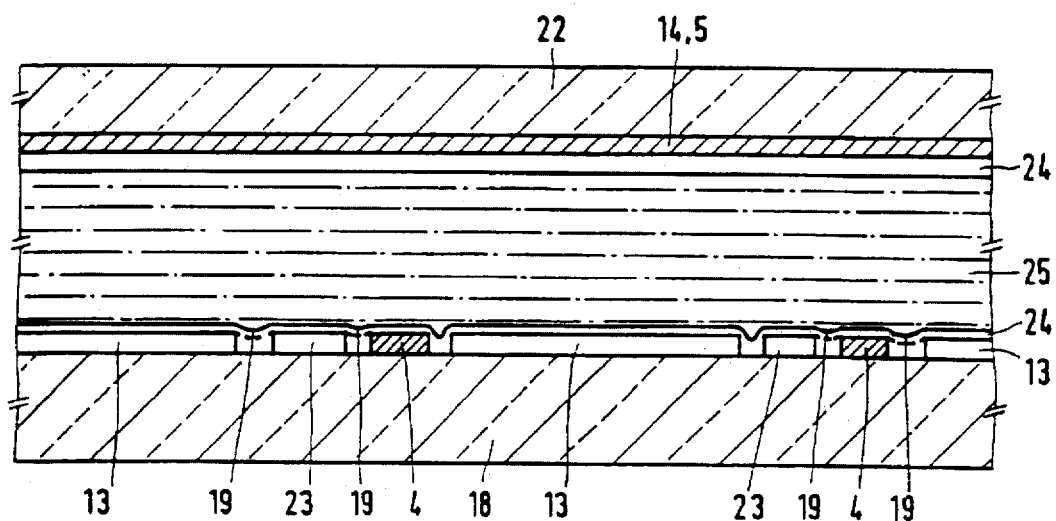
FIG. 5 is a diagrammatic cross-section of a part of a device according to the invention.

FIG. 5 is a diagrammatic cross-section of the device of FIG. 3. A first substrate 18 is provided with column electrodes 4 and picture electrodes 13, in this example of transparent conducting material, for example indium tin oxide which are connected to the column electrodes 4 via the MIMs 23 by means of connections 19 (shown diagrammatically).

A second substrate 22 is provided with picture electrodes 14 which are integrated to a common row or selection electrode 5 in this example. Moreover, the two substrates are coated with orienting layers 24, while a ferro-electric liquid crystal material 25 is present between the substrates. Possible spacers and the sealing edge, polarizers and possible other customary components are not shown.

Figure 4:
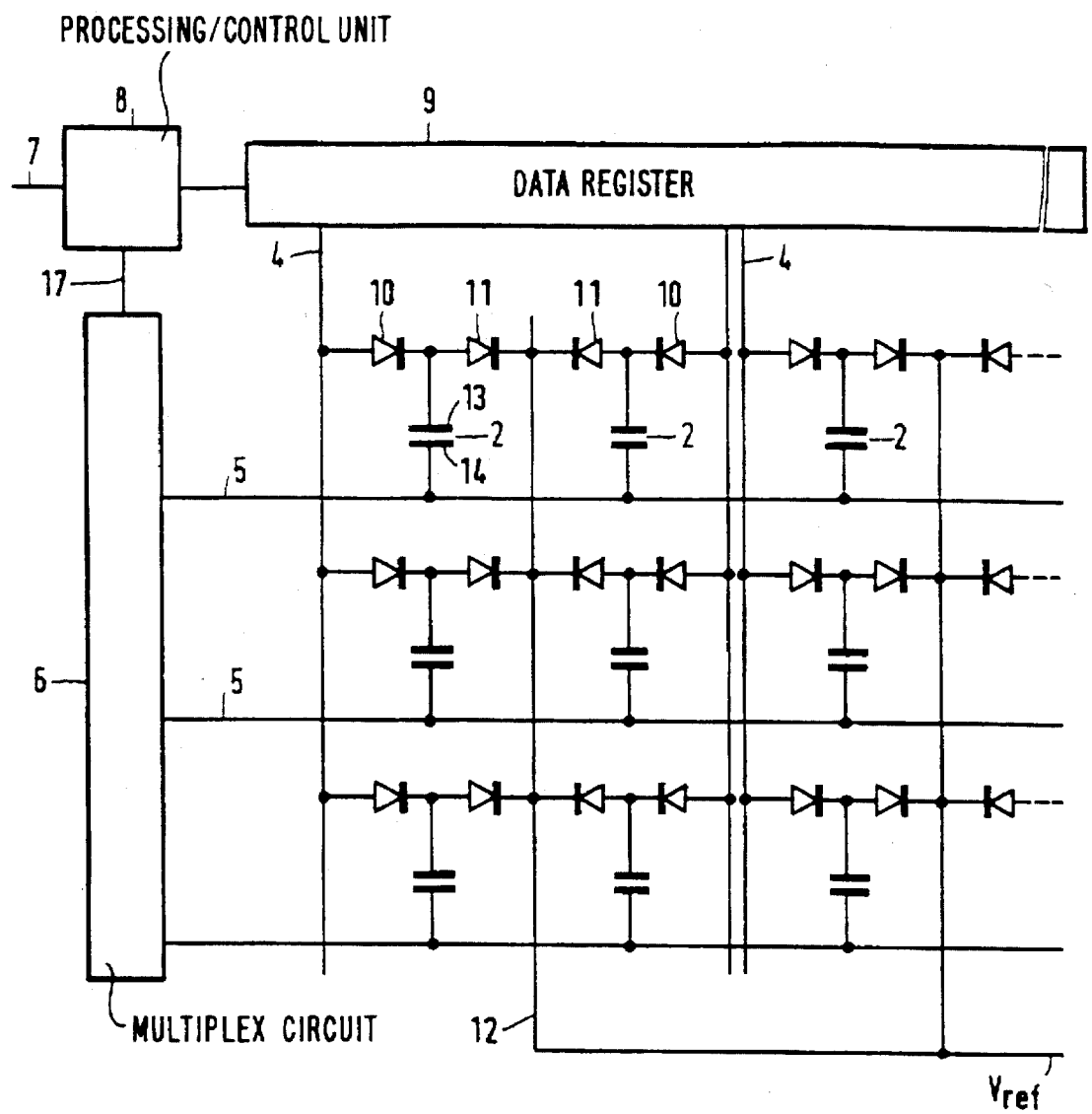

FIG. 4 shows an electrical equivalent diagram of a part of a display device with diodes. Of each pixel 2, which is now formed by picture electrodes 13, 14 arranged on facing substrates, the picture electrode 13 is connected in this example to a column electrode 4 via a diode 10 and to a line 12 for a common reference voltage via a second diode 11. The picture electrode 14 of each pixel is connected to a row electrode 5, while a plurality of picture electrodes in a row may be integrated to a row electrode.

For the devices of FIGS. 3 and 4, FIG. 6 shows diagrammatically the variation of the voltages $V_{row}$ at various row electrodes (row 1–row 5) and at one of the column electrodes ($V_{data}$). Within the interval $t_1$–$t_2$, a selection voltage $V_{sel}$ is presented to the row electrode "row 1", while within the interval $t_0$–$t_2$ a reset voltage $V_{res}$ is presented to the row electrode "row 3". $V_{res}$ is chosen to be such that the voltage difference ($V_{res}$–$V_{data}$) is always sufficient to bring the associated row of pixels to an extreme transmissive state ("blanking"), independent of the data voltage.

Within the interval $t_5$–$t_6$, a selection voltage $V_{sel}$ is presented to the row electrode "row 3" in this example, while a voltage $V_{data}$ is presented to the column electrode during $t_5$–$t_6$. The voltage difference ($V_{sel}$–$V_{data}$) brings the selective pixel in "row 3" to the desired transmissive state. Within the interval $t_2$–$t_4$, the pixels associated with "row 4" are similarly brought to the extreme transmissive state, while the pixels associated with "row 2" (which have been brought to an extreme transmissive state in advance via a similar "blanking" or reset) are brought to the desired transmissive state, and so forth.

Figure 6B:
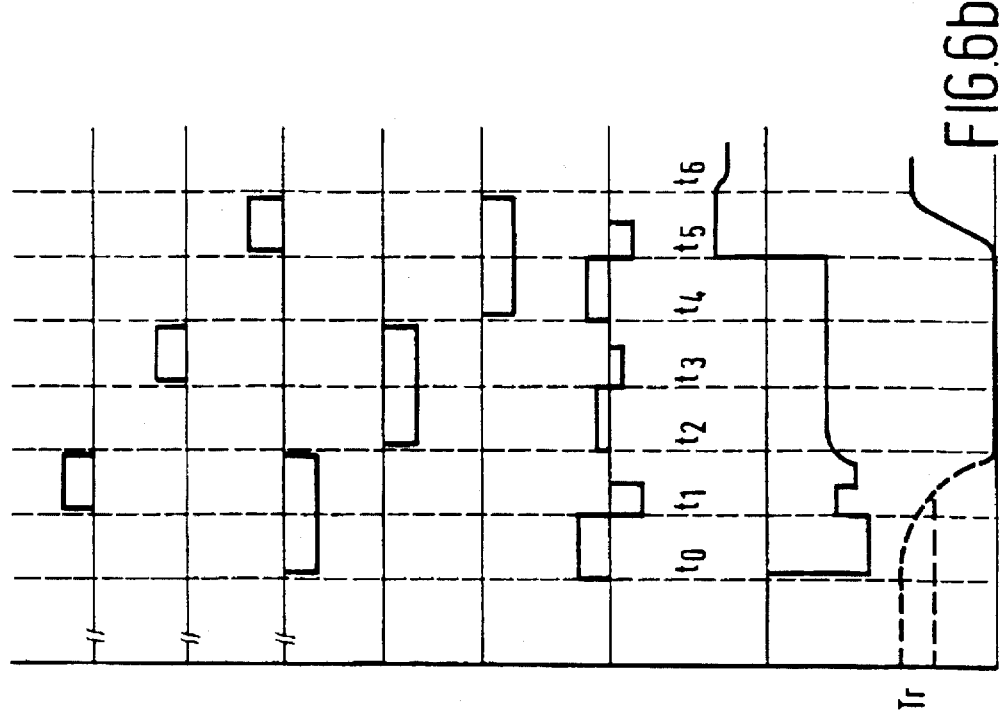
Figure 6A:
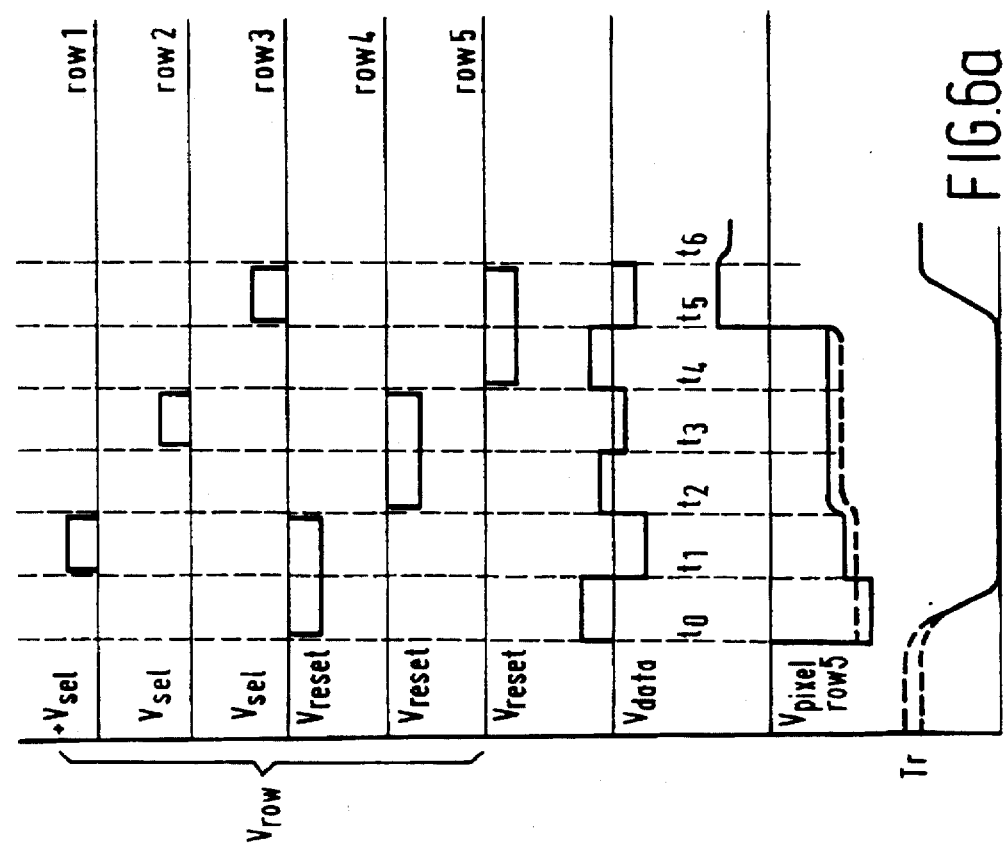

Since the data voltage changes while the pixel is no longer selected (at instant $t_6$), this change produces a substantially identical voltage division for different data voltages because the capacity of the pixel for ferro-electric liquid crystal materials is substantially constant, which voltage division can be simply compensated by means of, for example a fixed relative correction of the data voltage. Moreover, bipolar data signals are used (outside the actual selection periods, data signals are presented in an inverted manner), which reduces crosstalk. FIG. 6 shows how the voltage across the pixel $V_{pixel}$ and hence the transmission T changes due to said voltages for "row 3". Since the "blanking" of a line now does not influence the information of other lines, reset pulse (blanking pulse) may now last an entire line period (or even longer) so that lower voltages are sufficient. When the diagram of FIG. 4 is used, the reset voltage across the pixel is determined by the voltage at the row electrode 5 and the reference voltage at the voltage line 12; this voltage is substantially constant, as is shown in FIG. 6a by means of a broken line for $V_{pixel, row3}$, row 5. When the diagram of FIG. 3 is used, the reset voltage across the pixel is determined by the voltage at the row electrode 5 and the voltage at the column electrode 4 which is dependent on the data voltage. To ensure a good reset, the reset voltage at the row electrode must be chosen to be high enough. This can also be solved by causing the data voltage to end before the decay of the reset pulse, as is shown in FIG. 6b.

Figure 7:
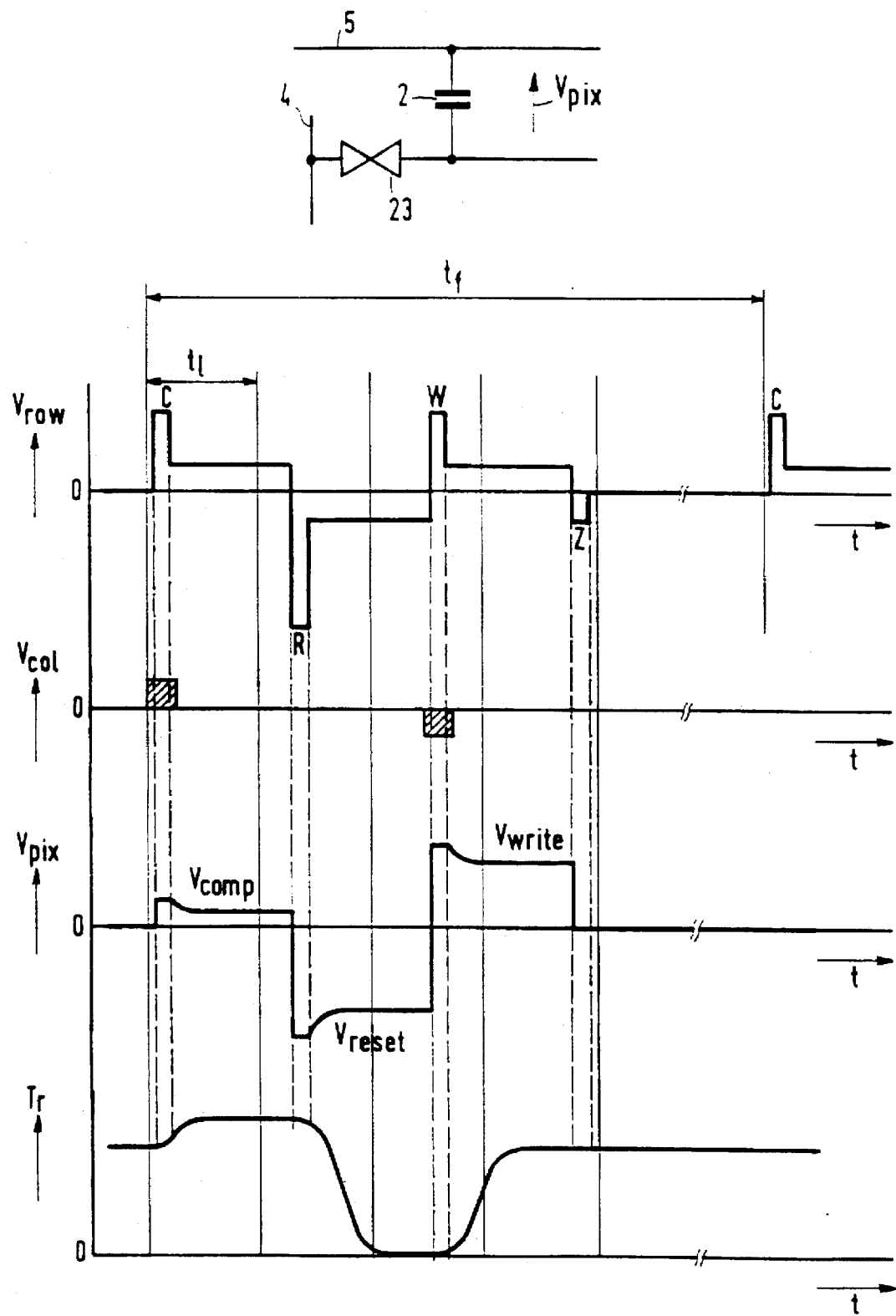
FIG. 7 shows diagrammatically a pixel according to the device of FIG. 3 and the control voltages on a row electrode and a column electrode, as well as the voltage across a pixel, and the transmission T due to this voltage across the pixel.

To eliminate possible DC components, a compensation pulse may be presented during a part of a line period $t_l$, preferably preceding the line period during a part of which the reset pulse is presented. For the device of FIG. 3 this is diagrammatically shown in FIG. 7. In addition to the diagrammatic representation of a pixel 2 with the associated two-pole element 23 and the drive lines 4, 5, FIG. 7 shows diagrammatically the drive voltages $V_{row}$ and $V_{col}$ at the row electrode 5 and the column electrode 4, respectively, and the voltage across the pixel $V_{pix}$ and the transmission T due to this voltage across the pixel. As is apparent from FIG. 7, a compensation pulse C (here during the first quarter of the line period) is first presented to the row electrode, which pulse, together with the data (related to the data to be written, in this example the inverse data signal) on the column electrode switches the pixel to an arbitrary transmission value for a short time. Since the compensation pulse C is presented before the reset pulse R, the transmission has an unwanted (often high) value only during a very short time. During a subsequent line period (here during the second quarter of the relevant line period) the pixel is switched to the extreme (here opaque) state by means of a reset or "blanking" pulse R so as to be provided with the desired information in a subsequent line period (during the third quarter of the line period) via the selection pulse or write pulse W and the data on the column electrode. In this example, the pixel voltage is set to 0 volt by means of a short circuit pulse Z during the next line period (during the last quarter of the line period), but this does not influence or hardly influences the ultimate transmission value. The value of the compensation pulse C is chosen to be such that the integral $\int V_{pix} dt$ in a frame period is substantially zero so that no DC components can build up, also because the pulses are presented during a very short part of the frame period. In the example this is effected within 4 line periods; in practice, the pulses C, R, W and Z may be spaced apart by several row selection periods, but this is at the expense of the contrast. In the embodiment of FIG. 4, the reset pulse R may be advantageously presented during a plurality of complete line periods, while the short-circuit pulse Z can be presented substantially during the entire frame period (viz. those line periods in which none of the pulses R, C and W are presented).

Since the data voltage pulses and inverse data voltage pulses overlap the compensation and selection pulses, the capacitive corrections as described above will be possible. Moreover, within a cycle (here the frame period $t_f$), both the data voltage and the inverse data voltage are presented, so that crosstalk is compensated.

Figure 8:
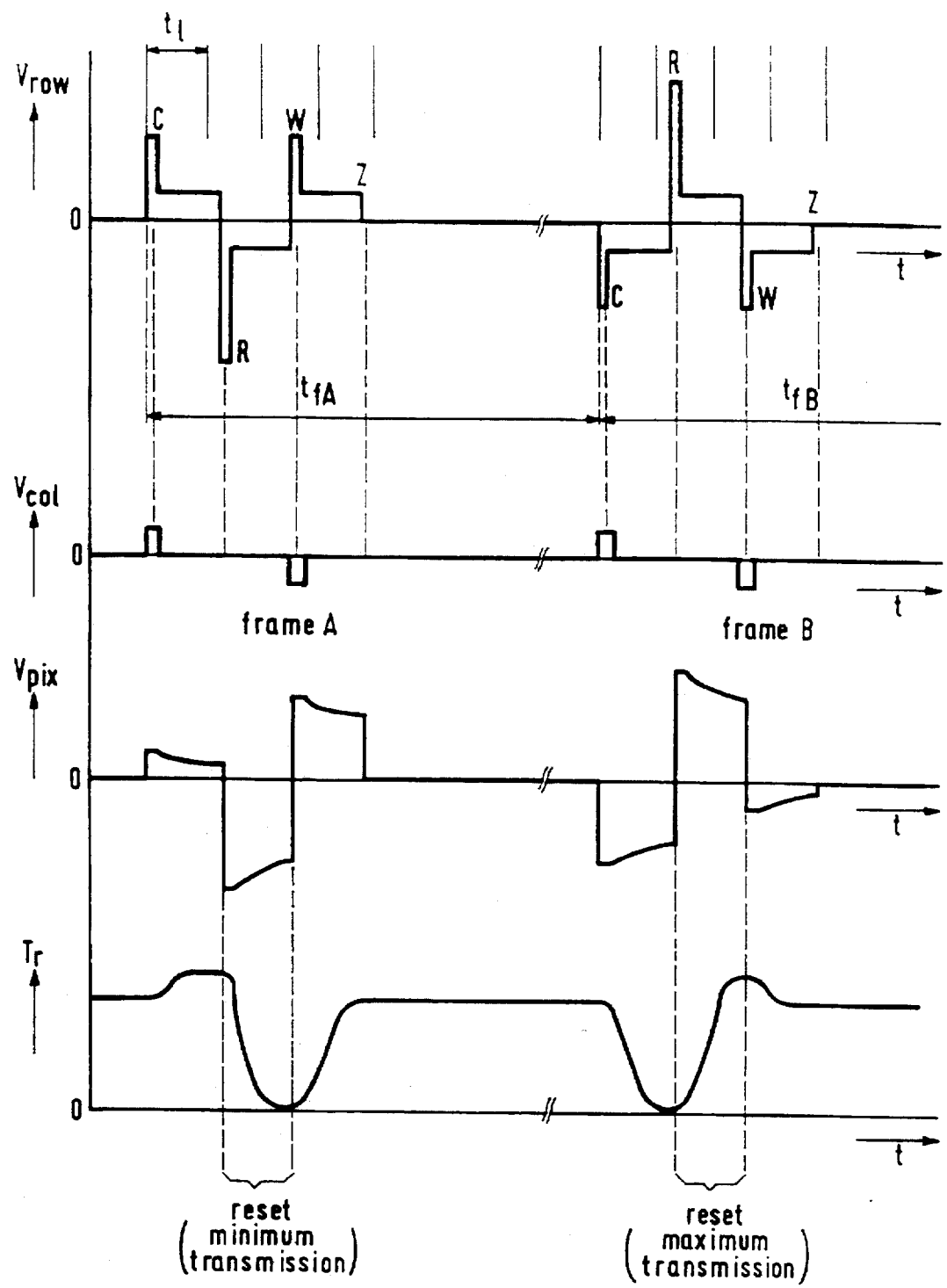

FIG. 8 shows a similar drive mode as FIG. 7, in which a kind of frame inversion is used. This provides an even greater certainty that the average pixel voltage is 0 volt, even at a small misadjustment of the drive apparatus. As is apparent from the Figure, the pixel is now reset to the maximum transmission during the second frame B, prior to writing. The data voltages in frame B are not inverted with respect to those in frame A. Possible large-area flicker, which may occur because the same drive mode is repeated after two frames, can be optically compensated by driving successive rows (or pairs of rows) in antiphase (row inversion).

Figure 9:
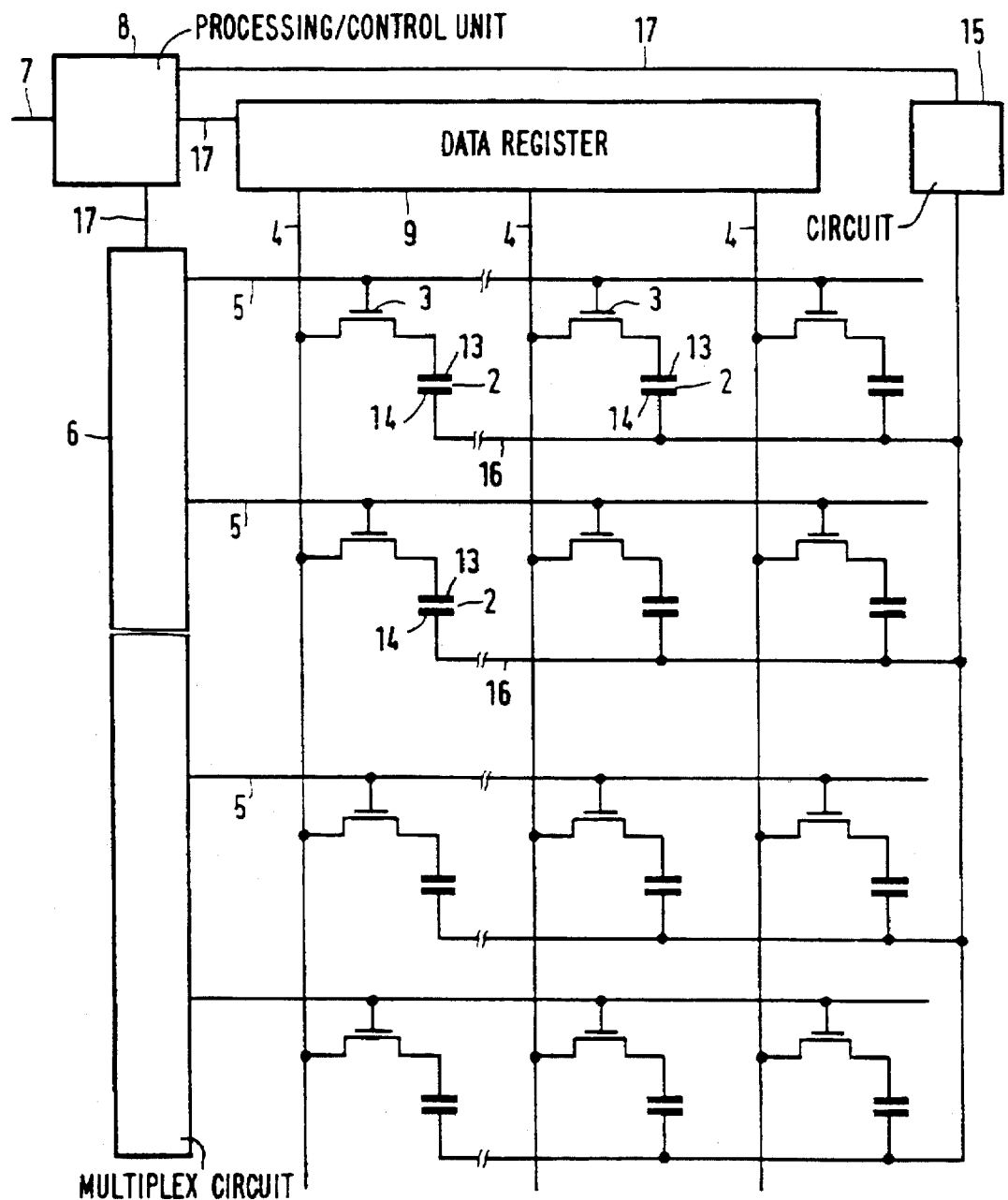
FIG. 9 shows an electrical equivalent diagram of a part of another ferro-electric liquid crystal display device used in the device of FIG. 1.

FIG. 9 shows an electrical equivalent diagram of a part of a display device 1. This device comprises a matrix of pixels 2 arranged in rows and columns. In this example, the pixels 2 are connected to column or data electrodes 4 via three-pole switches, in this example TFT transistors 3. A row of pixels is selected via row or selection electrodes 5 which select the relevant row via the gate electrodes of the TFTs. The row electrodes 5 are consecutively selected by means of a multiplex circuit 6.

Again, incoming (video) information 7 is stored in a data register 9, after it may have been processed in a processing/control unit 8. The voltages presented by the data register 9 (in this example positively chosen voltages) cover a voltage range which is sufficient to set the desired scale of grey levels. Pixels 2, here represented by means of capacitors, are charged via the TFTs 3 because the picture electrodes 13 are interconnected to the column electrodes during selection via said TFTs. In this example, the picture electrodes 14 constitute a common counter electrode for all picture electrodes 13 denoted by the reference numeral 16, but they may alternatively be in the form of strips which then form the common counter electrodes for the different rows of picture electrodes 13.

As described in U.S. Pat. No. 4,976,515, the display elements or pixels are brought to an extreme state by means of an auxiliary signal, prior to selection. To this end the device comprises a circuit 15 which supplies the counter electrode 14, 16 with a voltage $V_{comsel}$ and a voltage $V_{comres}$ during blanking (reset). This voltage $V_{comres}$ is sufficient to bring the pixels to the desired extreme state. The control unit 8 ensures the mutual control and synchronization again, inter alia, via control lines 17.

Figure 10:
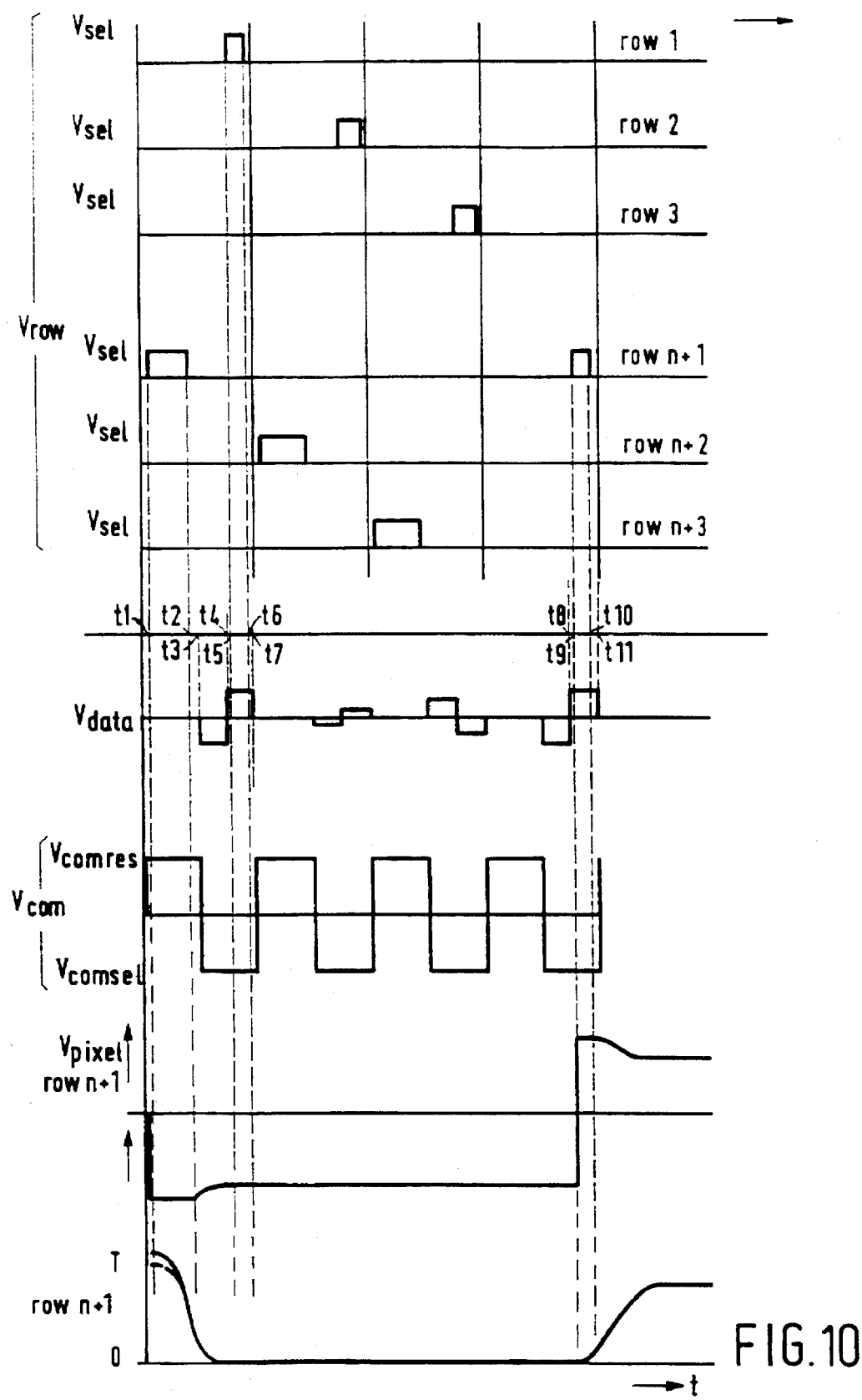
FIG. 10 shows diagrammatically the voltage variation for the lamp 108 via a number of lenses (not shown) which convert the light beam into a beam having a substantially rectangular cross-section towards a further reflector 121 which reflects the beam towards an aperture 110.

FIG. 10 shows diagrammatically the variation of the voltages at a plurality of row electrodes (row 1–row n+3), at one of the column electrodes ($V_{data}$) and at the counter electrode 14, 16 ($V_{com}$). During the interval $t_1$–$t_2$, a selection voltage $V_{sel}$ is presented to the row electrode "row n+1", while a reset voltage $V_{comres}$ is presented to the counter electrode. The voltage $V_{comres}$ is sufficient to bring the associated row of pixels to an extreme transmissive state ("blanking"), independent of possible voltages at the column electrodes before this row is selected from $t_0$ with a selection voltage $V_{sel}$ again, while data voltages ($V_{data}$) are presented to the column electrodes during the interval $t_8$–$t_{10}$, and a counter electrode for the device of FIG. 9, as well as the voltage variation across a pixel and the accompanying transmission.

DESCRIPTION OF THE PREFERRED EMBODIMENTS

Figure 1:
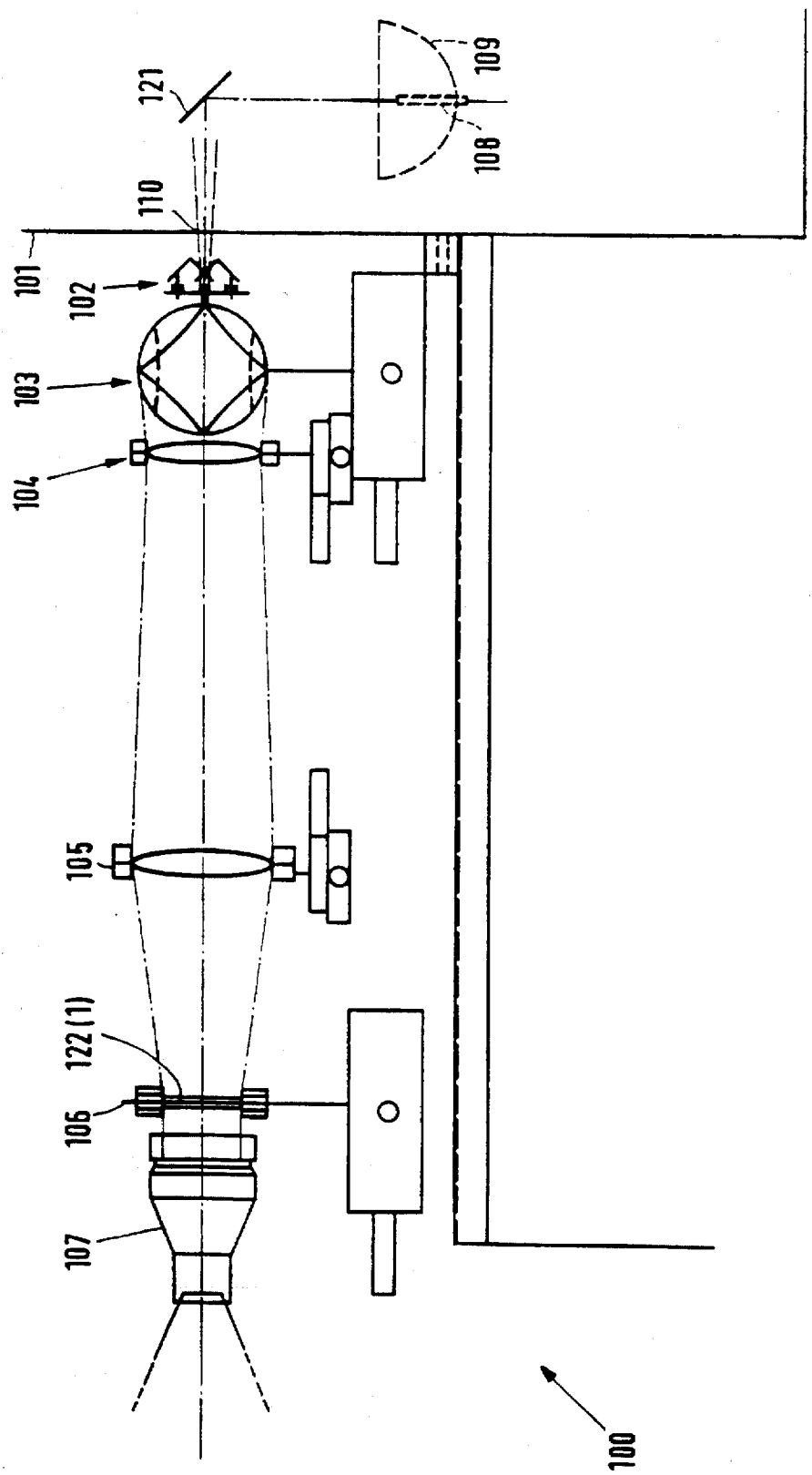
FIG. 1 shows diagrammatically a colour display device according to the invention.

FIG. 1 shows diagrammatically a colour display device 100 according to the invention, with an illumination system comprising a light source unit 101 and a system 102 of dichroic mirrors which split the light from the light source into separate strips of red, green and blue light, and a rotating prism 103. The device further comprises lenses 104, 105 and a light-switching device (light valve) 106 which is controlled, for example by means of video signals, and a projection lens 107. The light source 101 comprises a lamp 108 of a suitable type having a high intensity, such as a xenon arc lamp, and an elliptic reflector 109. The reflector is a cold-light reflector which reflects visible light and transmits infrared light. The reflector 109 reflects light from pixel $V_{pixel}$ and hence the transmission T changes (for row "n+1") due to said voltages after selection.

The invention is not limited to the examples shown. As already noted, other projection methods, in which the entire picture can be written during a sub-frame, can be used. Variations are also possible in the various drive modes, for example, prior to writing a (sub-)frame, a "blanking" pulse may be applied to the entire display device. The various drive modes are also applicable in other types of projection devices and in direct-vision display devices.

In summary, the invention provides a colour display device for projection of the type having a light-switching device which is illuminated by successive light strips of different colours (sequential colour single panel projector), or is illuminated by different beams within a frame, and in which a display device based on ferro-electric liquid crystal material is chosen for the light-switching device. Due to the voltage-independent capacitance of the pixels, a simple drive mode can be used, for which simple correction as a result of possible capacitive effects is sufficient. Notably when using a two-pole drive mode, the relatively longer time which is possible for (optical) reset can be used. A combination of the two drive modes is possible, while a compensation of DC effects within a small part of the frame period is also possible without this compensation having a detrimental influence on the contrast. The drive modes shown may also be used separately or in combination in independently used ferro-electric display devices.

We claim:

1. A display device comprising a first and a second substrate with a matrix of ferro-electric liquid crystal display elements arranged in rows and columns between the first and the second substrate, each display element being connected to a column electrode or a row electrode via an active switching element, the display device comprising means for bringing, prior to selection, a row of display elements to an extreme optical transmission state by means of an auxiliary signal, wherein the display device comprises a control circuit for presenting the auxiliary signal within a line period prior to selection of the row of display elements and for presenting compensation voltage across the row of display elements prior to the line period in which the auxiliary signal is presented, the compensation voltage being presented to any particular display element before the auxiliary signal is presented to said particular display element.

2. A display device as claimed in claim 1, characterized in that the active switching elements are two- pole switching elements.

relevant row. The row electrodes 5 are successively selected by means of a multiplex circuit 6.

Incoming (video) information 7 is stored in a data register 9 after it may have been processed in a processing/control unit 8. The voltages presented by the data register 9 cover a voltage range which is sufficient to adjust the desired scale of grey levels. Pixels 2 are charged during selection, dependent on the voltage difference between the picture electrodes 13, 14. In this example, the picture electrodes 14 constitute a common electrode 5.

To prevent charge which is still present at the pixels of a previous (sub-)frame from influencing picture information to be written, the display elements or pixels are brought to an extreme state, prior to selection, by means of an auxiliary signal. To this end, the multiplex circuit 6, which supplies the row electrode 5 with the desired selection voltage during selection, provides the row electrodes with a suitable reset voltage. Said reset voltage is chosen to be such that the pixels are brought to the desired extreme state.

elements with a short-circuit signal within yet another line period and in that the compensation signal, the auxiliary signal and the selection voltage change sign during successive cycles or frames.

5. A color display device comprising an illumination system for generating simultaneous light strips of different colors, and a light-switching device comprising a matrix of pixels, an optical system for displacing the light strips of different colors across a surface of the light-switching device so that parts of all different colors simultaneously reach the light-switching device, and a control device for addressing each individual pixel of the light-switching device illuminated by a light strip so that each relevant pixel provides picture information of the color of the illuminating light strip in accordance with picture data and modulates light of said illuminating light strip with the picture data, said light-switching device comprising a matrix of ferro-electric liquid crystal display elements arranged in rows and columns between a first substrate and a second substrate, each display element being connected to a column electrode or a row electrode via an active switching element, and a driving device which, prior to or during illumination of a relevant display element with light of a light strip, causes the relevant display element to switch to a transmission value defined by the picture data, the display device further comprising means for bringing the relevant display element to an extreme optical transmission state prior to switching the relevant display element to the transmission value defined by the picture data and for applying a compensating voltage across the relevant display element to compensate for D.C. effects prior to bringing the relevant display element to the extreme optical transmission state.

6. A color display device as defined in claim 5 wherein the active switching elements are two-pole switching elements.

7. A color display device as defined in claim 5 wherein the display device further comprises means for applying a short-circuit pulse to the row electrode of each relevant display element after switching the relevant display element to the transmission value defined by the picture data in order to set the voltage of the relevant display element to zero.

8. A color display device as defined in claim 5 wherein an auxiliary pulse brings the relevant display element to said extreme optical transmission state, said compensating voltage is applied with a compensation pulse, said relevant display element is switched to the transmission value defined by the picture data with a selection pulse, and said auxiliary, compensation and selection pulses are all applied to the relevant display element via a row electrode and are reversed in polarity during each successive cycle or frame.

* * * * *